Jan. 5, 1965   D. W. GRIMM ET AL   3,164,191
SNAP-OUT FASTENER AND CHANNEL ASSEMBLY
Filed Oct. 12, 1960   2 Sheets-Sheet 1
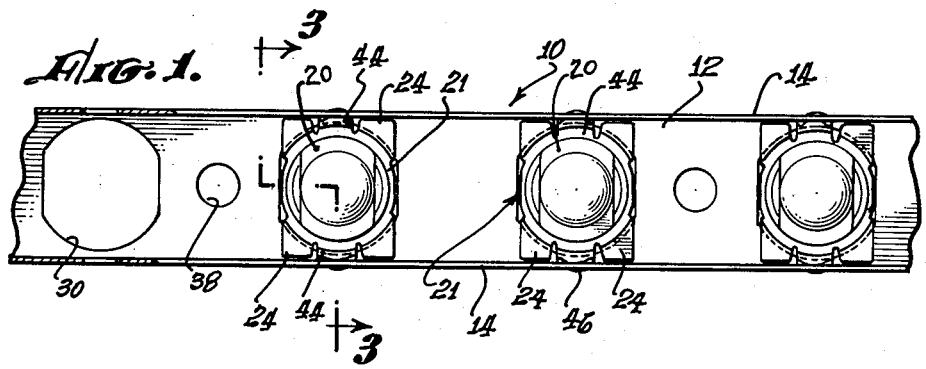
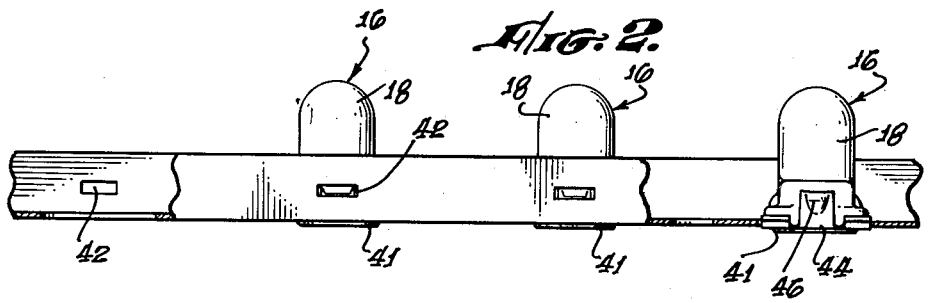
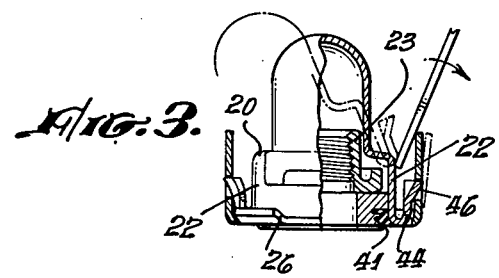
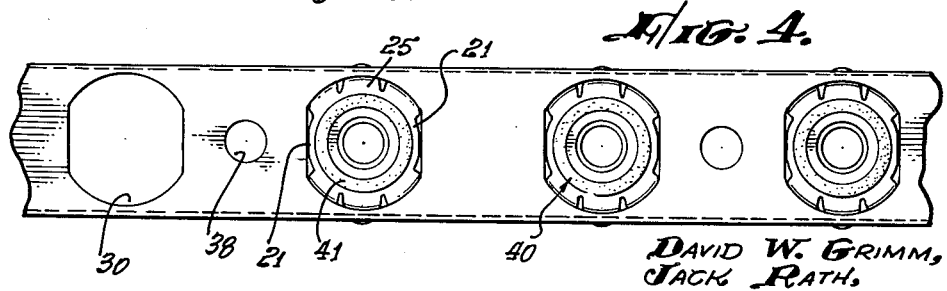
DAVID W. GRIMM,
JACK RATH,
INVENTORS.
BY *T. L. Stam*
ATTORNEY.

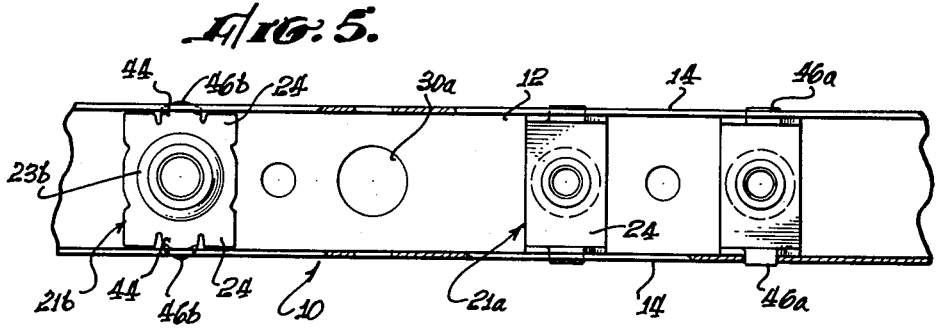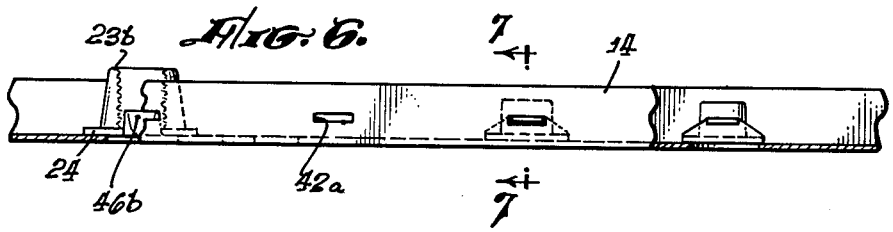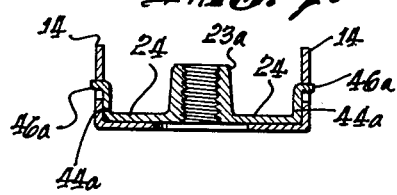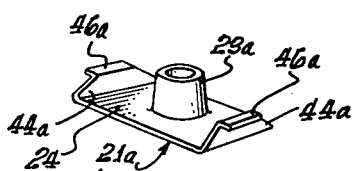

United States Patent Office 3,164,191
Patented Jan. 5, 1965

3,164,191
SNAP-OUT FASTENER AND CHANNEL ASSEMBLY
David W. Grimm and Jack Rath, Pico-Rivera, Calif., assignors to Kaynar Mfg. Co., Inc., Rivera, Calif., a corporation of California
Filed Oct. 12, 1960, Ser. No. 62,167
11 Claims. (Cl. 151—41.71)

This invention relates to gang channel of the type wherein a plurality of fastener elements are contained in spaced relationship in a channel member having side flanges perpendicular to a base web having openings therein to facilitate bolt insertion into the fastener elements.

Such gang channel has been used in various applications in the past and several distinct types have been developed. One type involves permanent connection of fastener elements to the channel member and may provide for some floating movement in all directions to permit alignment with off-center bolt holes in the panel to which the gang channel to be attached. Another type provides retainer shell elements which are connected to the channel and which in turn retain or contain a nut or fastener and in such devices, the floating feature, if desired, may be derived either by movement of the retainer element relative to the channel or by movement of the nut or fastener relative to the retainer element or both. The present invention is particularly directed to novel means for connecting fastener elements in the form of either retainers or fasteners to a channel member whereby such fastener elements may be readily removable and replaceable while having improved resistance to forces tending to push them out of the channel member.

It is generally true that prior gang channel assemblies holding removable parts have either the disadvantage that the removable parts are not readily removable from or insertable into the channel or, if insertion and removability is made easier, the resistance to push-out forces is reduced. The most common prior art constructions for elements removable from gang channel are of types wherein the fasteners or the retainers are held in the channel member by flat outwardly extending lugs which project through slots in the side flanges of the channel member. A disadvantage in such means for holding the fasteners or retainers in the channel member is that the said elements cannot be easily snapped into the channel member or removed therefrom without damaging or permanently distorting either the elements or the channel member. Moreover, such retention means does not afford the greatest resistance to push-out forces which tend to separate the elements from the channel member since simple bending of the outwardly extending lugs is all that is required to push the elements out of the channel.

It is also true that in some of the prior art the means for securing the fastener or the retainer to the channel member is such that some portion of such means projects below the lower surface of the base web and thereby interferes with the support structure on which the channel member is mounted. This becomes acute in applications to aircraft and missiles because of the streamlined configurations thereof and where gang channel must be mounted on structural elements which have circular, tapered, or twisted surfaces.

Furthermore, some of the prior art means for securing a fastener or a retainer to a channel member are made of heavy construction which generally increases the weight and bulk of the assembly and, therefore, are sometimes unsuitable to aircraft and missile applications where weight and bulk are disadvantageous.

The present invention provides novel structural means whereby the lugs on the fastener or the retainer are so arranged as to provide a maximum of resistance to push-out forces while nevertheless being readily removable from the channel member. This is accomplished by so shaping the lugs that they incline upwardly and outwardly toward the retaining openings in the side flanges and so that only a slight length of the lugs may be snapped into said openings. As a result, forces tending to push the fastener or retainer upwardly have a tendency to spread the lugs outwardly to inhibit separation due to push-out. Conversely, when removal is desired, insertion of a flat tool between the body of the fastener or the retainer and a side flange of the channel will release the fastener or retainer from the assembly very readily by flexing a side flange laterally beyond the lateral extent of the lug engaged thereby. Conversely, a fastener element may be very easily installed by inserting one lug thereof into a channel side flange opening and then pressing the element lightly into place.

It is, therefore, an object of the present invention to provide a snap-out gang channel assembly wherein a plurality of fasteners or fastener retaining shells can be secured therein in spaced relationship to each other and can be easily snapped into position in the channel member, and can be easily removed therefrom for replacement by the use of a simple tool such as a screw driver.

Another object of the present invention is to provide a novel snap-out gang channel assembly wherein fasteners or fastener retaining shells are contained so that they are prevented from rotating with a bolt when inserted into a fastener or into a fastener contained within a fastener retaining shell.

Still another object of the present invention is to provide a novel snap-out gang channel assembly wherein a removable element retained in the channel is permitted a degree of longitudinal float relative to the channel member.

A further object of the present invention is to provide a snap-out gang channel assembly wherein a nut retaining shell is retained by the gang channel in such a manner that the nut retaining shell extends through the lower web of the channel member for engagement with the surface of a supporting member to which the channel assembly is riveted or otherwise attached.

Yet another object of the present invention is to provide a novel snap-out gang channel assembly wherein a nut retainer shell is provided with outwardly extending lugs to bear against the base web of the channel member to resist push-out forces exerted vertically downwardly against the nut shell when a bolt is threaded into the nut element contained within the nut shell.

Another object of the present invention is to provide novel means whereby the fastener or the fastener retaining shell may be removably retained in the channel member and be capable of withstanding push-out forces applied upwardly and tending to separate it from the channel member.

A still further object of the present invention relates to novel means for securing nuts or nut retaining shells to a channel member wherein one or more of the nuts or nut retaining shells may be installed into or removed out of secured assembly with the channel member without disturbing the other parts mounted in the channel assembly.

Other objects and advantages of the present invention will become obvious from the following description when read in conjunction with the accompanying drawings and appended claims wherein like reference numerals designate similar parts throughout and in which:

FIGURE 1 is a plan view of one example of snap-out gang channel assembly according to the present invention, showing a plurality of nut retaining shells in longitudinally spaced relationship in a channel member;

FIGURE 2 is a front elevation of the gang channel assembly shown in FIGURE 1;

FIGURE 3 is an enlarged sectional view taken along the line 3—3 of FIGURE 1 including a showing of how a nut assembly is removed from the channel;

FIGURE 4 is a bottom view of the gang channel assembly shown in FIGURES 1, 2 and 3; and FIGURE 5 is a view similar to FIGURE 1, illustrating other examples of the application of the present invention to gang channel assemblies, wherein nut elements are held directly in the channel and wherein longitudinal float is provided;

FIGURE 6 is a front elevation of the structure shown in FIGURE 5; and

FIGURE 7 is an enlarged sectional view taken along the line 7—7 of FIGURE 6; and FIGURE 8 is a perspective view of one of the nut elements shown in FIGURE 7.

It should be understood that the basic premise of the present invention is the provision of outwardly and upwardly bent lugs on a fastener or fastener retainer, said lugs having edges of a length to be only slightly engageable in openings in the side flanges of a channel member whereby to be releasable by spreading the channel slightly and that this teaching may be applied in a wide variety of configurations and either with or without floatability.

Referring now to the drawings, FIGURES 1 to 4 illustrate one example of the use of the present invention in the removable retention of self-sealing nut assemblies in gang channel. For this special usage, it is necessary to seal the opening around the bolt access opening. For this reason, it is essential that the nut retainer shell include a sealing ring and that the portion of the shell including the sealing ring extend through the base web of the channel into sealing contact with the surface to which the gang channel is to be attached, and it is preferable that the nuts retained within the shell are freely movable therein to provide floatability for alignment with mating bolts, all as shown in these figures of the drawings.

In the FIGURES 1 to 4 modification, the gang channel assembly comprises a resilient channel member, designated generally by the reference numeral 10, having a base web 12 which has a series of bolt admission holes 30 and rivet holes 38 therein, and has integral side flanges 14 formed perpendicular thereto. The channel member 10 contains a plurality of nut retainer shells, generally designated by the reference numeral 16, longitudinally spaced from one another and each positioned over a bolt admission opening 30. The openings 30 are of non-circular configuration and of a size to be discussed hereinafter.

Each nut retainer shell 16 comprises a hood or dome portion 18 which is substantially cylindrical at its lower portion and has an outwardly extending shoulder portion 20 defining an enlarged section of a size and configuration suitable to accommodate a nut element 23 floatably disposed within the shell 16 and to accommodate an annular seal assembly at the lowermost extremity of the dome portion to hold the nut element 23 in the shell and to seal the dome and a threaded connection with a bolt when such a connection is made within the dome, as well as the bolt opening in the panel to which the gang channel is attached.

The bottom of the nut retainer shell 16, at the open end of the enlarged section 22 thereof, is provided with an outwardly extending integral flange 21. The flange 21 has outwardly extending portions or wings 24 extending laterally to either side of the dome portion 18 to an extent to permit engagement with side flanges 14 to inhibit lateral movement of the shell 16 in the channel 10. The flange 21 is of non-circular peripheral configuration at its center, as at 25, in the plane of the lower end of the dome 18 but has a circular opening to accommodate the annular seal assembly 40, as best seen in FIGURE 4. At the locations of connection of the portions or wings 24 to the base flange, the wings are bent upwardly a distance substantially equal to the thickness of the channel base web 12 and then laterally outwardly as at 26. The openings 30 in the base web are of a size and configuration to receive the flange 21 so that when a nut retainer shell is assembled in the channel member 10, the annular seal assembly is retained in the plane of the bottom of the base web 12, with the resilient seal element 41 extending downwardly therefrom, and the opposed wings or portions 24 resting upon the top of the base web 12, whereby the base web assists the side flanges 14 in resisting torque applied on the retainer shell and the nut contained therein.

The flange 21 of each of the retainer shells is provided with a pair of laterally extending portions or ears 44 inclined upwardly and outwardly and provided with arcuate retaining lugs 46 which extend laterally outwardly. Side flanges 14 of the channel member are provided with slots 42 to receive the lugs 46. Parenthetically, it should be noted that the arcuate configuration of the retaining lugs 46 augments the strength of the resilient portions or ears 44 and facilitates insertion and removal of the nut retainer shells 16 into and from the channel member 10.

It will be seen that any upward vertical push-out forces applied to the nut retainer shell 16 will be restrained by the portions or ears 44; will tend to urge the arcuate end portions 46 into more positive engagement with the side flanges 14; and will tend to project the lugs 46 outwardly through the slots 42.

The nut retainer shell 16 is prevented from being drawn through the central aperture 30 by means of the wings 24 which bear against the base web 12. The wings 24 serve another purpose in that they inhibit angular or lateral movement of the nut retainer shell 16 relative to the resilient channel member 10.

The nut retainer shell 16 is installed into the channel member 10 simply by placing the nut retainer shell in the channel member 10 with one of the arcuate end portions of the lugs 46 in position in one of the slots 42 in the side flanges and by then pressing downwardly on the dome portion 18 whereby the nut retainer shell 16 is snapped into position in the channel member 10.

To remove the nut retainer shell 16 from the channel member, all that is required is the insertion of the blade of a simple tool, such as a screw driver, between one of the portions or ears 44 and the shell base 22 and the exertion of a prying force against one of the side flanges 14 to easily snap the retainer shell 16 out of engagement with the channel member as illustrated in FIGURE 3.

In the specific self-sealing application of the present invention previously described, the nut element 23 is floatingly retained within the nut retainer shell 16 and float is not necessary in the relationship of the shell and the channel member. Actually, in order that a tight seal may be effected by the resilient sealing ring 41, the bottom flange 21 is arranged in the matching non-circular aperture 30 with the sealing ring extending downwardly therefrom as previously described. In this arrangement, the aperture 30 provides an added advantage in that it assists the side flanges 14 in resisting torque forces.

The foregoing description is of only one specialized adaptation of the present invention. The novel manner of providing a readily detachable relationship between gang channel and fastener elements retained therein, is as readily adapted to nuts or other fastener elements held directly in the channel and to simpler arrangements not requiring sealing means, and the base configurations of such fastener elements and the nature and configuration of the retaining lugs 46 may take a wide variety of shapes and forms.

Attention is now directed to FIGURES 5, 6, 7 and 8 illustrating further applications of the principles of the present invention. For such usages, wherein the nut elements 23a and/or 23b are directly held in the channel member, the bolt accommodating openings 30a are preferably of less extent than the nut base although larger than the bolt intended to be used, and the nut bases are flat and are slidably disposed over the base web 12 of the channel, see FIGURES 5, 6 and 7. The base configuration may take a wide variety of forms, as for example, the rectangular form designated generally by the numeral 21a or a planform similar to that of FIGURES 1 to 4 designated generally by the reference numeral 21b in the illustration in FIGURE 5. The only requirement is that the lateral extent of the base flanges be such as to fit relatively closely between the side flanges of the channel member so that the retaining lugs (46a, 46b) cannot slide out of the slots 42a in the side flanges.

For such usages, longitudinal float may be provided by forming slots 42a relatively longer than the longitudinal extent of the retaining lugs 46a or 46b. The lugs 46b may be formed of tapered upwardly directed portions 44a having outwardly extending lugs 46a as best shown in FIGURES 6 and 8 or may take a wide variety of forms, including that described in connection with FIGURES 1 and 4 and as shown at the left hand side of FIGURES 5 and 6.

From the foregoing description of the embodiments of the present invention illustrated in the drawings, it will be seen that this invention provides snap-out gang channel constructions which are simple in construction, has a wide range of utility, and in which each fastener or fastener retainer shell is held in positive engagement with a channel member and may be easily inserted into the channel member and removed therefrom without requiring special instruments or tools.

Although only a few forms of the present invention are shown and described herein, it is to be understood that various changes and modifications may be made without departing from the spirit of the invention.

Accordingly, it should be understood that the present invention is not intended to be limited by the specific illustrative examples, but rather by the scope of the appended claims.

What is claimed is:

1. In a gang channel of the type wherein a plurality of fastener assemblies including screw threaded portions are removably retained in a resilient channel member by virtue of the extension of laterally directed retaining lugs on the fastener assemblies into slots in both side flanges of the channel member, the improvement comprising base flange means carried by said assemblies and having portions extending laterally to limit lateral floating movement of said fastener assemblies in said channel, said slots having upper and lower edges, said lugs being integral with a pair of said portions and extending upwardly and outwardly therefrom, the length of said lugs being such that the end edges thereof are removably engageable under the upper edges of said slots in both of said flanges.

2. In a gang channel of the type wherein a plurality of fastener assemblies including screw threaded portions are removably retained in a resilient channel member by virtue of the extension of laterally directed retaining lugs on the fastener assemblies into slots in a pair of side flanges of the channel member, the improvement comprising base flange means integral with said fastener assemblies, said base flange means having portions extending laterally to limit lateral floating movement of said fastener assemblies in said channel, said slots having upper and lower edges, said lugs being integral with a pair of said portions and extending upwardly and outwardly therefrom, the length of said lugs being such that the end edges thereof are removably engageable under the upper edges of said slots in both of said side flanges, said lugs being arcuate in cross-section whereby they have improved strength characteristics and whereby there are smaller areas of contact between said lugs and said slots.

3. A fastener assembly including: a channel member having a base web and a pair of side flanges; said web having a bolt accommodating aperture therein; a fastener assembly including a screw threaded nut portion mounted on said web and a shell surrounding said nut portion; a flange extending laterally from said shell; said flange having portions disposed substantially in contact with said flanges; said portions being offset from the plane of the remainder of said flange so that said offset portions will overlie said base web; said remainder of said flange being disposed in said aperture substantially in coplanar relation with the outer surface of said web; an annular sealing assembly carried by said fastener assembly; said sealing assembly including an annulus coplanar with the plane of said remainder of said flange; a resilient washer engaging said annulus and extending below said plane; and means carried by said remainder of said flange and said flanges of said channel member respectively cooperable to detachably secure said fastener assembly to said channel member.

4. A snap out gang channel assembly comprising: a channel member having a base web and a pair of side flanges extending upwardly therefrom; said base web having a plurality of longitudinally spaced bolt accommodating apertures therein; said side flanges having opposed pairs of slots aligned with said apertures; fastener assemblies detachably associated with at least some of said apertures and their aligned pairs of slots; each of said fastener assemblies including an upstanding main body portion, a screw threaded portion and a base flange overlying one of said apertures; said base flange including opposed wing portions adapted to rest on said base web and extending laterally substantially into contact with said side flanges and other portions extending upwardly from said wing portions; and retaining lugs extending outwardly from said other portions; said slots having spaced upper and lower edges; said lugs extending upwardly into said slots such a distance that end faces of said lugs engage under said upper edges of said slots to removably retain said fastener assemblies in said channel member and whereby flexing of said channel in the vicinity of one of said fastener assemblies is effective to release said one fastener assembly from said channel.

5. A gang channel assembly according to claim 4, further characterized in that the free ends of said retaining lugs are arcuate in cross-section whereby to increase the strength of said lugs and to provide small arcuate areas of edge contact with the upper edges of said slots.

6. A snap-out gang channel assembly comprising: a channel member having a base web and a pair of side flanges extending upwardly therefrom; said base web having a plurality of longitudinally spaced bolt accommodating apertures therein; said side flanges having opposed pairs of slots aligned with said apertures; each of said slots having upper and lower edges; fastener assemblies detachably associated with at least some of said apertures and their aligned pairs of slots; each of said fastener assemblies including an upstanding main body portion, a screw threaded portion and a base flange overlying one of said apertures; said base flange including opposed wing portions adapted to rest on said base web and extending laterally substantially into contact with said side flanges and other portions extending upwardly from said wing portions; and retaining lugs extending laterally outwardly from said other portions; said lugs having outer end portions extending through and somewhat beyond said opposed slots in said pair of side flanges with parts of said outer end portions engaged with the upper edges only of said slots whereby said fastener assemblies are removably retained in said channel member.

7. A gang channel assembly according to claim 6, wherein the said screw threaded portion constitutes the bore of a nut.

8. A gang channel assembly according to claim 7, wherein said base flange is flat and rectangular in planform; wherein said retaining lugs are integral with said other portions, said outer end portions of said lugs being also directed upwardly in said slots, the length of said outer end portions of said lugs being slight, whereby said lugs may be readily snapped out of said slots.

9. A gang channel assembly according to claim 6, wherein at least one of said fastener assemblies includes a fastener retaining shell, the main body portion of said shell comprising a dome portion and an enlarged lower body portion to which said base flange is integrally attached.

10. A gang channel assembly according to claim 9, wherein said shell has an annular sealing assembly in the bottom thereof, said annular sealing assembly comprising a metal annulus coplanar with the plane of the base flange in the area of its attachment to said body portion, and a resilient washer extending below said plane.

11. A gang channel assembly according to claim 10, wherein one of the bolt accommodating apertures is associated with said shell and has a non-circular configuration, wherein said base flange is within said one aperture and said opposed wing portions are raised above the said plane of the base flange a distance equal to at least the thickness of said base web, and wherein the base flange in the said plane has a non-circular configuration similar to and slightly smaller than the configuration of said bolt accommodating aperture.

References Cited in the file of this patent

UNITED STATES PATENTS

| | | |
|---|---|---|
| 2,144,553 | Simmonds | Jan. 17, 1939 |
| 2,244,823 | Burke | June 10, 1941 |
| 2,244,976 | Tinnerman | June 10, 1941 |
| 2,333,386 | Murphy | Nov. 2, 1943 |
| 2,438,044 | Freesz | Mar. 16, 1948 |
| 2,455,145 | Swanstrom | Nov. 30, 1948 |
| 2,815,789 | Hutson | Dec. 10, 1957 |
| 2,820,499 | Schaaf | Jan. 21, 1958 |
| 2,836,215 | Rapata | May 27, 1958 |
| 2,875,804 | Flora | Mar. 3, 1959 |
| 2,915,152 | Graham | Dec. 1, 1959 |

FOREIGN PATENTS

| | | |
|---|---|---|
| 594,260 | Canada | Mar. 15, 1960 |